(12) United States Patent
Reinhard et al.

(10) Patent No.: US 11,827,806 B2
(45) Date of Patent: Nov. 28, 2023

(54) COMPOSITIONS AND METHODS FOR PRETREATING SUBSTRATES FOR THE SUBSEQUENT FIXING OF VAPOR PHASE CORROSION INHIBITORS

(71) Applicant: EXCOR Korrosionsforschung GmbH, Dresden (DE)

(72) Inventors: Georg Reinhard, Dresden (DE); Peter Neitzel, Dresden (DE); Frank Fassbender, Dresden (DE); Gerhard Hahn, Hann. Muenden (DE)

(73) Assignee: EXCOR Korrosionsforschung GmbH, Dresden (DE)

( * ) Notice: Subject to any disclaimer, the term of this patent is extended or adjusted under 35 U.S.C. 154(b) by 886 days.

(21) Appl. No.: 16/733,080

(22) Filed: Jan. 2, 2020

(65) Prior Publication Data
US 2020/0216678 A1 Jul. 9, 2020

(30) Foreign Application Priority Data
Jan. 4, 2019 (DE) .......................... 102019100123.4

(51) Int. Cl.
| | | |
|---|---|---|
| C09D 5/00 | (2006.01) | |
| C09D 105/08 | (2006.01) | |
| B32B 29/06 | (2006.01) | |
| B32B 29/08 | (2006.01) | |
| B32B 27/32 | (2006.01) | |
| B32B 27/30 | (2006.01) | |
| D21H 19/24 | (2006.01) | |
| D21H 19/52 | (2006.01) | |
| C23F 11/02 | (2006.01) | |
| D06M 13/432 | (2006.01) | |
| D21H 23/70 | (2006.01) | |
| D21H 23/30 | (2006.01) | |

(52) U.S. Cl.
CPC ............ *C09D 5/002* (2013.01); *B32B 27/302* (2013.01); *B32B 27/32* (2013.01); *B32B 29/06* (2013.01); *B32B 29/08* (2013.01); *C09D 105/08* (2013.01); *C23F 11/02* (2013.01); *D21H 19/24* (2013.01); *D21H 19/52* (2013.01); *D06M 13/432* (2013.01); *D21H 23/30* (2013.01); *D21H 23/70* (2013.01)

(58) Field of Classification Search
CPC .... C09D 5/002; C09D 105/08; B32B 27/302; B32B 27/32; B32B 29/06; B32B 29/08; C23F 11/02; D21H 19/24; D21H 19/52; D21H 23/30; D21H 23/70; D06M 13/432
See application file for complete search history.

(56) References Cited

U.S. PATENT DOCUMENTS

| | | |
|---|---|---|
| 919,778 A | 4/1909 | Scanlan |
| 2,270,775 A | 1/1942 | Stember |
| 2,534,201 A | 12/1950 | Hutter |
| 2,739,871 A | 3/1956 | Senkus |
| 2,986,447 A | 5/1961 | Raifsnider |
| 3,836,077 A | 9/1974 | Skildum |
| 3,887,481 A | 6/1975 | Korpics |
| 3,967,926 A | 7/1976 | Rozenfeld et al. |
| 4,124,549 A | 11/1978 | Hashiudo et al. |
| 4,275,835 A | 6/1981 | Miksic et al. |
| 4,290,912 A | 9/1981 | Boerwinkle et al. |
| 4,374,174 A | 2/1983 | Stricklin et al. |
| 4,973,448 A | 11/1990 | Carlson et al. |
| 5,139,700 A | 8/1992 | Miksic et al. |
| 5,209,869 A | 5/1993 | Miksic et al. |
| 5,332,525 A | 7/1994 | Miksic et al. |
| 5,393,457 A | 2/1995 | Miksic et al. |
| 5,958,115 A | 9/1999 | Boettcher et al. |
| 6,054,512 A | 4/2000 | Nelson et al. |
| 6,139,688 A | 10/2000 | Ramachandran |
| 6,183,825 B1 | 2/2001 | Crook |
| 6,224,957 B1 | 5/2001 | Crook et al. |
| 6,464,899 B1 | 10/2002 | Haas et al. |

(Continued)

FOREIGN PATENT DOCUMENTS

| | | |
|---|---|---|
| CN | 106223118 A | 12/2016 |
| CN | 107142781 A | 9/2017 |

(Continued)

OTHER PUBLICATIONS

English-language Machine Translation of Abstract, Description, and Claims of Application Serial No. CN 106223118.
English-language translation of Search Report issued in corresponding Russian application (dated 2020).
English-language abstract of RU1799893 (1993).
Partial English Translation of Wang, Shan (2017). "Preparation and Application of Environment-Friendly Polymer Materials", Beijing University of Technology Press, pp. 138-143.
English abstract for CN 107142781 A (2017).
English abstract for CN 107964826 A (2018).
English abstract for CN 108468249 A (2018).
Atkins, "Physical Chemistry", Fifth Edition, pp. 846-856 (1994).
Bellich et al., ""The Good, the Bad and the Ugly" of Chitosans", Marine Drugs, vol. 14, No. 99, pp. 1-31 (2016).

(Continued)

*Primary Examiner* — Robert S Walters, Jr.
(74) *Attorney, Agent, or Firm* — Caesar Rivise, PC

(57) ABSTRACT

Substance combinations are disclosed which include urea, at least one chitosan biopolymer having a degree of deacetylation of from 70% to 95%, and at least one dicarboxylic acid in aqueous solution. The substance combinations are useful as primers for the pretreating substrate surfaces, in particular flat or sheet-form, non-metallic substrates, which are provided as carrier materials for vapor phase corrosion inhibitors, to enable subsequent fixing to those substrate surfaces of vapor phase corrosion inhibitors from an aqueous or aqueous-alcoholic solution containing them. Certain embodiments of the substance combination include 0.1-2% by weight chitosan biopolymer, 10-25% by weight urea, and 0.5-2.5% by weight of a dicarboxylic acid, completely dissolved in deionized water. Yet a further, related aspect of the invention relates to a carrier material for vapor phase corrosion inhibitors, wherein the vapor phase corrosion inhibitors are fixed to a substrate surface pretreated with the substance combination.

17 Claims, No Drawings

(56) References Cited

U.S. PATENT DOCUMENTS

| | | |
|---|---|---|
| 6,488,998 B1 | 12/2002 | Crook |
| 6,752,934 B2 | 6/2004 | Reinhard et al. |
| 6,773,774 B1 | 8/2004 | Crook et al. |
| 6,787,065 B1 | 9/2004 | Schapira et al. |
| 7,261,839 B2 | 8/2007 | Kubik et al. |
| 7,297,191 B1 | 11/2007 | Miksic et al. |
| 7,763,213 B2 | 7/2010 | Miksic et al. |
| 7,824,482 B2 | 11/2010 | Reinhard et al. |
| 8,283,024 B2 | 10/2012 | Kubik et al. |
| 8,461,063 B2 | 6/2013 | Wachs et al. |
| 8,637,139 B2 | 1/2014 | Todt et al. |
| 8,795,589 B1 | 8/2014 | Furman et al. |
| 8,906,267 B2 | 12/2014 | Reinhard et al. |
| 8,920,714 B2 | 12/2014 | Kelley, II |
| 9,435,037 B2 | 9/2016 | Kharshan et al. |
| 9,518,328 B1 | 12/2016 | Whited et al. |
| 2010/0008097 A1 | 1/2010 | Illium et al. |
| 2010/0065157 A1 | 3/2010 | Dornbusch et al. |
| 2015/0018461 A1 | 1/2015 | Todt et al. |
| 2019/0093236 A1 | 3/2019 | Reinhard et al. |

FOREIGN PATENT DOCUMENTS

| | | |
|---|---|---|
| CN | 107964826 A | 4/2018 |
| CN | 108468249 A | 8/2018 |
| DE | 1521900 | 5/1969 |
| DE | 295668 A5 | 11/1991 |
| DE | 298662 A5 | 3/1992 |
| DE | 9210805 U1 | 2/1994 |
| DE | 69804586 T2 | 11/2002 |
| DE | 10241040 B4 | 4/2003 |
| DE | 102006053292 A1 | 5/2008 |
| DE | 102007059726 A1 | 7/2009 |
| DE | 102011054619 A1 | 4/2013 |
| DE | 102012000255 A1 | 7/2013 |
| DE | 102017122483 B3 | 10/2018 |
| EA | 016910 B1 | 8/2012 |
| EP | 0639657 A1 | 2/1995 |
| EP | 0662527 B1 | 5/1997 |
| EP | 0825019 A2 | 2/1998 |
| EP | 0953081 B1 | 4/2002 |
| EP | 1219727 A2 | 7/2002 |
| EP | 1218567 B1 | 3/2004 |
| EP | 0990676 B1 | 5/2006 |
| EP | 2347897 A1 | 7/2011 |
| EP | 2184162 B1 | 8/2012 |
| EP | 2730696 A1 | 5/2014 |
| EP | 2752290 A1 | 7/2014 |
| EP | 1641960 B1 | 9/2014 |
| GB | 646662 A | 11/1950 |
| JP | 58063732 A | 4/1983 |
| JP | 61227188 A | 10/1986 |
| JP | 62063686 A | 3/1987 |
| JP | 63028888 A | 2/1988 |
| JP | 63183182 A | 7/1988 |
| JP | 63210285 A | 8/1988 |
| RU | 1799893 A1 | 3/1993 |
| WO | 03022887 A1 | 3/2003 |
| WO | 2008124058 A1 | 10/2008 |
| WO | 2016037682 A1 | 3/2016 |
| WO | 2017156304 A1 | 9/2017 |

OTHER PUBLICATIONS

E. Kunze (ed.), Korrosion und Korrosionsschutz, vol. 3, Wiley-VCH, Berlin, New York 2001, p. 1679-1714.

Hongjun et al., "Fabrication of the Volatile Corrosion Film with FGMs Structure", Materials Science Forum, vols. 423-425, pp. 591-592 (2003).

Koehler et al., "VCI containing package material—mode of functioning", Int. J. Corros. Scale Inhib., vol. 3, No. 4, pp. 286-306 (2014).

Kopacic et al., "Alginate and Chitosan as a Functional Barrier for Paper-Based Packaging Materials", Coatings, vol. 8, No. 235, pp. 1-15 (2018).

Mahamood et al., "Functionally Graded Materials, Topics in Mining, Metallurgy and Materials Engineering", Springer Int., Ch. 2, p. 9-21 (2017).

Vuorinen et al., "Introduction to Vapour Phase Corrosion Inhibitors in Metal Packaging", Surface Engineering, vol. 20, No. 4, pp. 281-284 (2004).

Xu et al., "Composite Film Based on Pulping Industry Waste and Chitosan for Food Packaging", Materials, vol. 11, No. 2264, pp. 1-11 (2018).

Zargar et al., "A Review on Chitin and Chitosan Polymers: Structure, Chemistry, Solubility, Derivatives, and Applications", ChemBioEng Rev., vol. 2, No. 3, pp. 204-226 (2015).

English-language abstract for JP 58063732.
English-language abstract for JP 61227188.
English-language abstract for JP 62063686.
English-language abstract for JP 63028888.
English-language abstract for JP 63183182.
English-language abstract for JP 63210285.
English-language abstract for EP 2347897.
English-language abstract for EP 2730696.
English-language abstract for EP 2752290.

COMPOSITIONS AND METHODS FOR PRETREATING SUBSTRATES FOR THE SUBSEQUENT FIXING OF VAPOR PHASE CORROSION INHIBITORS

CROSS-REFERENCE TO RELATED APPLICATIONS

This application claims priority to DE 102019100123.4, filed Jan. 4, 2019, the contents of which are incorporated herein by reference in their entireties for all purposes.

FIELD OF THE INVENTION

The present invention relates to substance combinations of aqueous chitosan-urea solutions and their use for the application-specific pretreatment of flat or sheet-form substrates, in order subsequently to fix conventional vapor phase corrosion inhibitors (VpCI, volatile corrosion inhibitors, VCI) on the dried, firmly adhering covering of the respective substrate by coating and thus provide particularly efficient emitters of the respective vapor phase corrosion inhibitors in packaging or on storage in closed spaces in order to protect common commodity metals against corrosion in humid climates.

BACKGROUND OF THE INVENTION

For a number of decades, compounds identified as corrosion inhibitors which additionally tend to evaporate or sublimate even under normal conditions and are thus able to pass via the gas phase onto metal surfaces to be protected have been used for the temporary corrosion protection of metal articles within closed spaces, for example in packaging, switch cabinets or display cabinets. This manner of protecting metal parts against corrosion during storage and transportation is the clean alternative to temporary corrosion protection using oils, greases or waxes.

It is known that all measures for the temporary corrosion protection of metals against the action of air-saturated aqueous media or condensed water films have the aim of preserving the primary oxide layer (POL) which is always present on common commodity metals after initial contact with the atmosphere from chemical and mechanical degradation (see e.g.: E. Kunze (ed.), Korrosion and Korrosionsschutz, Volume 3, Wiley-VCH, Berlin, New York 2001, p. 1679-1714; S. Koehler, G. Reinhard, VCI containing package materials—mode of functioning, Int. J. Corros. Scale Inhib., 2014, 3, No. 4, p. 286-306). In order to achieve this by the use of corrosion inhibitors which act preferably via the vapor phase, it must, however, be taken into consideration that the common commodity metals and the POLs present on their surfaces have different chemical properties. Vapor phase corrosion inhibitors are therefore in principle to be selected according to the type of metal to be protected (see e.g.: U.S. Pat. Nos. 4,374,174, 6,464,899, 6,752,934 B2, 7,824,482 B2 and 8,906,267 B2).

For articles and structures which have been manufactured from different metals and may further optionally be present in different processing states (crude, ground, polished, etc.), suitable combinations of different corrosion inhibitors are consequently required in order to ensure reliable temporary corrosion protection for each of the metals and surface states in question within the same container or a common packaging. Since such mixed-metal articles and components are nowadays those that are most commonly represented technically, the provision of products for their temporary preservation is becoming increasingly more important. This concerns especially products that are provided with a combination of volatile corrosion inhibitors (VpCI/VCI), each matched to the different sensitivity of the metals and surface states to be protected in air of different relative humidity and composition.

For the temporary corrosion protection of metal parts during transportation and storage within closed packaging, there are mainly used nowadays emitters filled with a powdered or granulated VpCI/VCI combination (pouches or capsules), paper, cardboard or plastics substrates which are coated with a VpCI/VCI combination, and also flat or sheet-form plastics products (e.g. films, containers, boxes, trays) into the walls of which a VpCI/VCI combination has been incorporated by extrusion or injection molding.

There may be mentioned by way of example U.S. Pat. Nos. 3,836,077, 3,967,926, 4,124,549, 4,290,912, 5,209,869, 5,332,525, 5,393,457, 6,752,934 B2, 7,824,482, 8,906,267 B2, 4,124,549, EP 0639657 and EP 1219727, in which such packaging means with different combinations of VpCI/VCI are described.

Experience has shown, however, that it is frequently difficult to provide products from which the VpCI/VCI components in question evaporate or sublimate to the extent that is required for reliable temporary corrosion protection.

In order to make such an application successful, it must always be taken into consideration that the packaging process for metal components usually takes place in air of different relative humidity and composition, so that the containers and packaging in question consequently also contain the corresponding water-vapor-containing air after they have been closed. It is therefore not sufficient to use a packaging means which contains a VpCI/VCI combination which is matched to the type and surface states of the metals to be protected. Depending on the specific composition of the atmosphere within a packaging and on the temperature, further measures are to be taken with which it is ensured that the active ingredients are released relatively quickly and in a sufficiently high concentration from the respective VpCI/VCI depot by evaporation and/or sublimation, reach the metal surfaces to be protected by diffusion and convection within the closed packaging, and there form an adsorption film before water is able to condense out of the moist air present in the packaging at the same location or further corrosive constituents which are present in the atmosphere of the interior of the packaging cause corrosion processes either alone or together with the condensed water.

The time referred to as the so-called build-up phase (conditioning or incubation time), during which, after the container/packaging has been closed, the conditions for VCI corrosion protection are established, is naturally dependent on the corrosion susceptibility of the metal parts that are to be protected. This is in turn dominated mainly by the surface condition. It is therefore not sufficient merely to use a combination of VpCI/VCI components that is matched to the type of metals to be protected, but they must also always be so applied that the so-called build-up phase that is required for the development of their action is adapted to the particular requirements. If this is not taken into account, there is the risk that the corrosion process will start even before the VCI molecules have passed into the vicinity of the metal surface.

In order to adapt the build-up phase to the particular technical requirements for a selected combination of VpCI/VCI components in a given packaging, it must be taken into consideration that virtually all the technically available VpCI/VCI depots, such as, for example, the filled emitters or the VpCI/VCI packaging means which at the same time are used as the carrier matrix for the active ingredients in question, as is the case, for example, with the conventional VpCI/VCI papers and the VpCI/VCI-containing polyolefin (PO) products, are functionally graded materials (FGMs). It is known that the FGMs include all materials whose composition and structure change gradually over the volume and thereby determine a required function (see e.g.: R. M. Mahamood, E. Titilayo Akinlabi, Functionally Graded Materials, Topics in Mining, Metallurgy and Materials Engineering, Springer Int. Publishing AG 2017, Ch. 2, p. 9-21; Huang HongJun, Wan HongJing, Li ZhiGuang, Zhang Min, Fabrication of the Volatile Corrosion Film with FGMs Structure, Materials Science Forum Vols. 423-425 (2003) pp. 591-592).

In the case of the VpCI/VCI depots, that required function consists especially in the emission of the VpCI/VCI components from the depot in question, it being possible for this process to be broken down into a plurality of sub-steps, as follows:

(1) migration of the VpCI/VCI particles from the inside of the depot (e.g. powder mixture of an emitter, coating of a paper or the inside of a film containing the VpCI/VCI components) to the phase boundary with the interior of the packaging,
(2) adsorption thereof at that phase boundary, and
(3) desorption thereof from the phase boundary with subsequent sublimation into the interior of the packaging.

Only for step (3) must the active ingredients in question have a sufficiently high sublimation pressure. Step (2) depends mainly on the interactions into which the always polar VpCI/VCI particles enter with the pouch material of an emitter, the matrix of the coating of a VpCI/VCI paper or the polyolefin selected for a VpCI/VCI film and the processing aids involved therein. In the interests of effective VCI corrosion protection, these interactions are to be prevented from being more energy-intensive, which can be the case, for example, if these carrier materials themselves have polar components or contain further polar constituents.

For step (1), the regular delivery of VpCI/VCI particles from the inside of the depot emitter, coating or polymer matrix to the phase boundary by migration, the concentration gradient of those particles over the depot in question is primarily responsible. This develops only after sublimation of the VpCI/VCI particles present directly at the phase boundary in the starting state of a VpCI/VCI depot and can become all the greater, the higher the specified concentration of those active ingredients within the emitter or carrier material.

On the basis of the consideration of the VpCI/VCI-emitting packaging means as FGMs, it accordingly follows that the coatings and polymers used as carriers for these active ingredients must have the property of absorbing maximum amounts of micronized solids, as represented by the VpCI/VCI particles, and allowing them to migrate at room temperature, for example as a result of transposition processes, as soon as a concentration gradient as the driving force of the migration has built up within the depot in question as a result of sublimation of the VpCI/VCI particles which are already in the starting state in the phase boundary region.

According to the physico-chemical laws applying to migration (see e.g.: P. W. Atkins, Physical Chemistry, $5^{th}$ Ed., Oxford Univ. Press, Oxford, Melbourne, Tokyo 1994, p. 846-852), the VpCI/VCI particles should be present in the active ingredient mixture singly, that is to say with as small a radius r as possible, since as particle agglomerates with a larger r they would migrate far more slowly. VpCI/VCI systems must additionally be present in a perfectly mixed form, so that all the components forming the system and thus producing the mechanism of action always migrate and are emitted from the depot at any one time—until the sublimation equilibrium within the packaging in question is established.

It is known that solids which already tend to sublimate under normal conditions establish their evaporative equilibrium with the gas phase all the more easily, the larger their specific surface area. The provision of such corrosion inhibitors in powder form with as small a particle size as possible can therefore be regarded as a fundamental requirement for establishing as short a build-up phase as possible. VpCI/VCIs in the form of finely dispersed powders, packaged in pouches made of a material which is permeable to the active ingredients in vapor form (e.g. paper pouch, porous polymer film, perforated capsule), have long been commercially available for this purpose. Exposing them within a closed packaging in addition to the metal parts to be protected is the simplest form of practical application of VpCI/VCIs (see e.g.: E. Vuorinen, E. Kalman, W. Focke, Introduction to vapor phase corrosion inhibitors in metal packaging, Surface Engng. 29 (2004) 281 pp., U.S. Pat. Nos. 4,973,448, 5,393,457, 6,752,934 B2, U.S. Pat. No. 8,906,267 B2, U.S. Pat. No. 9,435,037 and EP 1 219 727 A2). Moreover, the build-up phases achievable thereby can easily be regulated by the permeability of the walls of such depots. If mixtures of different corrosion inhibitors are to be used thereby, it is additionally to be ensured that they neither react chemically with one another nor lead to the formation of agglomerates, since this would prevent, or at least more greatly impair, both their joint emission from the depot and their required chemisorption at the metal surfaces to be protected.

Despite the mentioned advantages of such VpCI/VCI emitters, their technical use is limited and, in particular in the case of the automatic packaging processes which are conventional nowadays, unattractive because of additional operations which are difficult to automate (e.g.: placing the emitters inside the packages or the removal and separate collection thereof at the end of transportation).

Experience has shown that the incorporation of VpCI/VCIs into polymeric carrier materials, preferably into polyolefins (PO), such as polyethylene (PE) or polypropylene (PP), and the provision of VpCI/VCI-emitting films and further PO products (boxes, trays, etc.), as is proposed, for example, in U.S. Pat. Nos. 4,124,549, 4,290,912, 5,139,700, 6,464,899 B1, 6,752,934 B2, 6,787,065 B1, 7,261,839 B2, 7,824,482, 8,283,024 B2, EP 1 218 567 B1 and EP 1 641 960 B1, is a particularly widespread practice nowadays, specifically because these products can advantageously be applied in the automation of packaging processes.

However, these polymer-based VpCI/VCI products generally have the disadvantage that the VpCI/VCIs incorporated within the context of extrusion via the polymer melt are present within the polymer matrix in a relatively fixedly embedded manner, in contrast to the above-described VpCI/VCI depots with powder or granule fillings, and their emission therefrom is possible only with comparative difficulty. Moreover, experience has shown that, in VpCI/VCI films, which are nowadays usually used with layer thicknesses d in the range 30 µm≤d≤120 µm, it is not possible to accommodate such high specific active ingredient concentrations as in the VpCI/VCI emitters, for example. In addition, losses of VpCI/VCI components which are difficult to control usually occur during the extrusion of the masterbatches and films in question as a result of the thermal stresses that arise thereby. A number of known and proven VpCI/VCI components cannot even be incorporated into polymers, because they would not withstand the thermal stresses that thereby occur.

According to experience, it has therefore not been possible to use any of the VpCI/VCI substance combinations which have become known hitherto to provide films which are suitable for the VCI corrosion protection of metal surfaces with above-average susceptibility to corrosion, simply because it has not been possible, for the reasons stated, to establish conditions under which the selected active ingredients develop a sufficiently high concentration gradient within the VpCI/VCI film, as is required to achieve a relatively short build-up phase. The VpCI/VCI films which are nowadays available commercially have therefore hitherto been used especially as mass-produced articles which are technologically easy to apply, without being able to satisfy higher demands in terms of their VCI corrosion protection properties.

In order to improve this situation and make packaging with polymer films more efficient as regards the VpCI/VCI system that is introduced, a number of proposals have become known. All measures to allow the emission of the VpCI/VCI components integrated into polymer films in only one direction, oriented towards the metal part to be protected in the packaging, and to provide the opposite side with barrier properties appear obvious. Attempts were thus made to laminate the film containing the VpCI/VCI system on one side with a thin metal film or to provide it with a thin layer of a polymer blend which is not identical to the carrier polymer of the active ingredients (see e.g.: U.S. Pat. Nos. 5,393,457, 5,139,700, EP 0662527 A1, U.S. Pat. Nos. 6,183, 825 B1, 6,224,957 B1, 6,488,998 B1, 6,773,774 B1, 8,283, 024 B2, 8,920,714 B2, US 2010/008097 A1 or DE 10 2011 054 619 A1). However, according to experience it has not hitherto been possible to achieve an acceleration of the emission of the VpCI/VCI components in question into the interior of the closed packaging either by using an outer barrier layer film or by configuring the outside of a VpCI/VCI-containing film produced by coextrusion as a diffusion barrier. In addition, the substantially higher production costs of such VpCI/VCI-containing films and the difficulty of recycling them because of the metal layer or the different types of polymer (e.g.: PE, PA, PET, TPE, TPU) have hitherto prevented wider economical use.

Against this background, further measures have been proposed for shortening the so-called build-up phase for the VpCI/VCI system integrated into a packaging film so that improved VCI corrosion protection properties result. One such method is, for example, the coating of the inside of a polymer film with a gel containing the VpCI/VCI components, fixed beneath a gas-permeable inner film of Tyvek® 1059 (DuPont) (see U.S. Pat. No. 7,763,213 B2). It should thereby be possible to provide substantially higher amounts of the VpCI/VCI components than is possible by direct integration into a polyolefin film by means of extrusion, and thus ultimately establish conditions under which a significantly greater concentration gradient could be developed for the VpCI/VCI components in question, provided the properties of the inner film of Tyvek® 1059 permit a correspondingly higher emission rate of the active ingredients.

A further, approximately equivalent method consists in introducing individual or a plurality of VpCI/VCI components in relatively large amounts into a suitable adhesive, in order subsequently to coat the inside of polymer films therewith as required (see e.g.: EP 0 825 019 A2, EP 2 184 162 B1, EP 2 347 897 A1, EP 2 730 696 A1, DE 10 2012 000 255 A1, U.S. Pat. No. 8,637,139 B2, US 2015/0018461 or WO2016/037682 A1). However, this requires an adhesive which is compatible with the VpCI/VCI components introduced and which cures as a sufficiently porous layer, in order that higher emission rates of these components are achieved than from films into which the VpCI/VCI components have been integrated during extrusion. However, experience has shown that the one-component reactive adhesives which have hitherto preferably been used have the significant disadvantage that they react chemically with most of the VpCI/VCI components from the groups of the aromatic and aliphatic amines, amino alcohols and amine carboxylates which are conventional nowadays, and therefore cannot be used.

In order nevertheless to provide a packaging material which contains larger amounts of VpCI/VCI components than can be accommodated in films by extrusion and which can thus be used for metal articles which are particularly susceptible to corrosion, EP 2 752 290 A1 proposes building it up in three layers, an outer film of a plastics material which functions as a barrier for the migration of the VpCI/VCI components, a layer of a foamed plastics material, referred to as a reservoir layer, which contains the VpCI/VCI components in question in particularly high specific concentrations, and a film laminated on the inside as a so-called transfer layer, the permeability of which for the active ingredients may also have been improved with suitable fillers.

However, experience has shown that the production of such packaging means which are to be built up in a plurality of plies from different materials always requires a higher outlay in terms of process technology and is therefore too cost-intensive for general use. Moreover, as has already partly been emphasized, the selection of the carrier material (gel, adhesive, plastics foam, etc.) serving as the reservoir for the VpCI/VCI components continues to be beset with problems, since the migration of the active ingredients involved within such media is naturally greatly limited and, for that reason alone, the reservoir in question cannot be distinguished as an efficient FGM.

Since it has been established that the conventional VpCI/VCI components can be incorporated in relatively large amounts into polar plastics materials, such as the polyurethanes, polystyrenes, styrene block copolymers, acrylonitrile-butadiene-styrene (ABS), silicones, fluorosilicones, ethylene-vinyl acetate (EVA) or polysulfides, by extrusion or injection molding, it obviously appeared tempting to prepare efficient VpCI/VCI-emitting packaging means in that manner (see e.g.: U.S. Pat. Nos. 6,464,899, 6,054,5132, 6,464,899 B1, 7,261,839 B2, 8,283,024 B2 or EP 1 641 960 B1). In addition, attempts were made to incorporate VpCI/VCI components during the foaming of polymeric solids (see e.g. JP 58.063.732, U.S. Pat. Nos. 4,275,835, 6,054,512, 8,920,714 B2 and DD 295.668), preferably in order to produce PUR foam filled with VpCI/VCI. However, according to present experience, the emission rates of the VpCI/VCIs from these plastics usually lag far below the requirements, obviously because of more intensive interactions of the VpCI/VCI components, which are likewise polar, within these polar carrier materials. Therefore, packaging means having an incorporated ply of plastics foam as the reservoir for the VpCI/VCI components have hitherto not been able to gain acceptance even for specific applications in the watchmaking or microelectronics sector, as has been attempted, for example, in U.S. Pat. No. 6,054,512.

It is as yet not possible to estimate the extent to which this situation can be improved if, instead of the mentioned, synthetically produced plastics materials, biopolymers are used as carriers for the VpCI/VCI components, as is proposed, for example, in U.S. Pat. Nos. 7,261,839 B2, 7,270,775 B2, 7,297,191 B1, 8,795,589 B1, EP 0 990 676 B1 or EP 1 641 960 B1, since, according to our own research, such products are not yet customary in the market, at least in Europe. If, however, it is recommended for the provision of VpCI/VCI-emitting films and containers, which are to be biodegradable, for example, first to incorporate the active ingredients in the form of a concentrate into a biodegradable polyester from the group of the ε-caprolactones, the poly (hydroxybutyrate co-valerates)(PHBV) with 8, 16 or 24% valerate, the uncoated or nitrocellulose-coated cellophanes or the chitosans crosslinked with epichlorohydrin and then dilute these concentrates for the production of films and containers with in each case the same biodegradable polyesters (see e.g.: U.S. Pat. Nos. 7,261,839 B2, 7,270,775 B2 or EP 1 641 960 B1), then it can again be assumed, according to experience, that high emission rates of the VpCI/VCI components in question, and thus efficient FGMs, are not to be expected as a result of the incorporation of more polar VpCI/VCI components into a polar polymeric carrier material due to more intensive interactions.

In order to provide, by technologically uncomplicated methods, packaging means which contain any desired VpCI/VCI components in relatively high specific concentrations and emit them, on the basis of the FGM concept, to such an extent that the relatively short build-up phases required for reliable VCI corrosion protection are achieved, it continues to appear most expedient to provide the packaging means in question with a suitable active-ingredient-containing coating.

In principle, there is merely required therefor a coating composition that contains the desired VpCI/VCI components in relatively high concentrations, wets the selected carrier material well, so that sufficiently large amounts of a wet film can thereby be deposited, after the drying of which the VpCI/VCI components in question are micronized and remain on the surface of the carrier material in relatively high specific concentrations.

However, for the technical application of packaging means provided with VpCI/VCIs in this manner, it is also to be ensured that the active ingredients are stably fixed on the carrier material at least to such an extent that they are not uncontrollably lost mechanically during conventional handling. On the other hand, this fixing of the VpCI/VCI active ingredients to the surfaces of the carrier material must also not be so intensive that the emission thereof into the adjacent gas phase is impaired, since this would, as is known, result in reduced VCI corrosion protection.

Since most of the VpCI/VCI components known today are sufficiently soluble in water or water/alcohol mixtures, such solutions of VpCI/VCI components have already long been used to provide papers and cardboard as sheet-form packaging means with VpCI/VCI components (see e.g. JP 61.227.188, JP 62.063.686, JP 63.028.888, JP 63.183.182, JP 63.210.285, U.S. Pat. Nos. 919,778, 2,534,201, 2,986,447, 3,887,481, 7,824,482 B2, 8,906,267 B2, DD 298 662, DE 1521900 and DE 10 2017 122 483.1).

However, in the coating of such substrates and even more so in the coating of plastics surfaces of interest with aqueous, aqueous-organic or organic solutions of the VpCI/VCI components, the dimension- and amount-stable fixing of the active ingredients to the substrate in question is found to be problematic to this day. After evaporation of the respective solvent, they are usually present on the substrate only as amorphous particle agglomerates or microcrystallites. And only if the substrate has sufficient roughness or structural porosity can such finely powdered solids be deposited at least partially also within pores and similar voids. Depending on the surface condition of the substrates, there is therefore usually the risk, even during simple handling, that the active ingredients will be mechanically detached and run out of the surface of the coated packaging means, so that it cannot reliably be ensured that the papers, cardboard or inside surfaces of plastics containers so treated still have the specific surface concentrations of VpCI/VCIs that are required for corrosion protection at the time of their use.

In order to limit at least the extent of this disadvantage, it is proposed in DE 9210805 first to treat one side of corrugated cardboard by impregnation with the active-ingredient-containing aqueous solution as carrier and depot for the VpCI/VCIs and, after drying, to cover it with a thin, porous ply of paper in order to ensure that the active ingredients are held on the surface of the corrugated cardboard in question until its intended use. However, with this type of fixing of the VpCI/VCIs, the emission thereof into the interior of a cardboard packaging produced therewith is dependent especially on the concentration gradient of the active ingredients within the paper ply and no longer on their amounts and particle sizes in the depot.

As an alternative for eliminating these disadvantages, there is described in U.S. Pat. No. 5,958,115 a corrosion-inhibiting composite material which consists of a mixture of a metal oxide sol, the corrosion inhibitors capable of sublimation and further additives and which forms on substrates such as paper, cardboard or PUR foam a relatively adherent, sufficiently porous gel film of the metal oxides and additives used, in which the VpCI/VCI components are stably fixed in comparatively large amounts and during usual mechanical stresses and are released therefrom with a uniform, long-lasting emission rate. However, according to experience, it has hitherto not been possible to make this method of fixing VpCI/VCI components to sheet-form substrates in a ready-to-use manner economically acceptable, mainly because the sol state of these composite materials is maintained over several hours for processing only in water-alcohol mixtures with >70% alcohol (preferably ethanol). The coating of substrates with such filled sols on a commercial scale naturally additionally requires associated installations for the recovery or catalytic post-combustion of the alcohol, which is again associated with a higher cost outlay.

Although experience has shown that, if the VpCI/VCI components are dispersed in an organic film-forming agent, such as polyacrylate, alkyd, epoxy or phenolic resin, and a sheet-form carrier material, such as that described, for example, in JP 61.227.188, JP 62.063.686, JP 63.028.888, JP 63.183.182, JP 63.210.285, DD 298 662, U.S. Pat. Nos. 5,958,115, 8,795,589 B1, 9,518,328 B1 and EP 0 990 676 B1, is coated therewith, there is obtained in each case a packaging means on the surface of which the active ingredients in question are present in relatively high specific concentrations, their emission rate is dependent mainly on the properties of the cured polymeric film-forming agent. According to experience, neither paper nor plastics substrates can be distinguished as efficient FGMs by means of such VpCI/VCI coatings, because the speed of migration of the VpCI/VCI particles within the cured film-forming agent always remains far too low even if above-average active ingredient volume concentrations are incorporated and adjuvants that promote migration are used.

The object of the invention is to open up a more effective and technically readily implementable way by which, specifically by means of aqueous VpCI/VCI coating solutions, conventional VpCI/VCI components can be fixed with sufficient mechanical and chemical stability to solids surfaces in relatively high specific concentrations and as a result, compared to the above-mentioned disadvantages of conventional methods for treating the wide range of substrates commonly used for packaging means, significantly improved conditions for the provision of efficient VpCI/VCI depots are created.

Surprisingly, it has been possible to achieve this object according to the invention by using a substance combination which comprises urea, at least one chitosan biopolymer having a degree of deacetylation of from 70% to 95%, and at least one dicarboxylic acid in aqueous solution, according to claim 1 as a primer for pretreating the surfaces of substrates, in particular non-metallic substrates, which are provided as carrier materials for vapor phase corrosion inhibitors, in order to facilitate or enable the subsequent fixing to those substrate surfaces of vapor phase corrosion inhibitors from an aqueous or aqueous-alcoholic solution containing those active ingredients.

Related aspects and more specific embodiments of the invention are subject-matter of the further claims.

DESCRIPTION OF THE INVENTION

The substance combination used according to the invention comprises urea, at least one chitosan biopolymer having a degree of deacetylation of from 70% to 95%, and at least one dicarboxylic acid in aqueous solution.

The relative proportions of the different components can vary according to the specific field of application, and suitable compositions can easily be determined by a skilled person in this field by means of routine experiments.

In a preferred embodiment of the substance combination used according to the invention, the chitosan is present as component (1) in an amount of from 0.1 to 2% by weight, urea is present as component (2) in an amount of from 10 to 25% by weight, and a dicarboxylic acid is present as component (3) in an amount of from 0.5 to 2.5% by weight, completely dissolved in water, preferably deionized water.

"Deionized water", as used herein, can in principle be prepared by any known method for desalination/demineralization, in particular ion exchange, membrane filtration or distillation, and is available commercially.

In the preparation of such homogenized solutions, the urea component serves as an adjuvant in that it advantageously assists the dispersion of the customary chitosans having a degree of deacetylation of from 70% to 95% in the water initially introduced, in dependence on their differing mean molar mass, and thus facilitates the dissolution thereof by proteolytic reactions with the dicarboxylic acid in question.

The water-soluble dicarboxylic acid is selected from the group of the aliphatic saturated dicarboxylic acids and preferably from the group which comprises butanedioic acid (succinic acid), pentanedioic acid (glutaric acid), hexanedioic acid (adipic acid), heptanedioic acid (pimelic acid), 2-aminobutanedioic acid (aspartic acid) or 2-aminopentanedioic acid (glutamic acid) and mixtures thereof.

In a preferred embodiment, the substance combination used according to the invention further comprises viscosity regulators, in particular cellulose-based, non-ionic thickeners.

Optionally, two or more components of the substance combination used according to the invention can also be present in the substance combination at least partially in a mutually associated form or in the form of conjugates.

In terms of the method, the above object of the invention can be achieved in particular in that the substrate provided for the fixing of VpCI/VCI components is first coated with the substance combination used according to the invention, that is to say a urea-containing aqueous chitosan-dicarboxylic acid solution, as primer and subjected to thermal aftertreatment, before being coated with an aqueous or aqueous-alcoholic solution containing the conventional VpCI/VCI active ingredients.

By means of this method according to the invention there are obtained, in comparison to the analogous substrates without pretreatment according to the invention, higher specific concentrations of the VpCI/VCI components in question, or the fixing thereof is made possible for the first time, so that the substrates equipped according to the invention with these active ingredients, as efficient FGMs, can ensure particularly reliable temporary corrosion protection within packaging, storing and transportation processes of the common commodity metals.

As is known, the biopolymer chitosan (poly-D-glucosamine) is prepared as a polyaminosaccharide from chitin (poly(N-acetyl-1,4-β-D-glucopyranosamine) by deacetylation. Since this operation usually remains incomplete, various products of chitosan are commercially available, depending on the mean molar mass and the degree of deacetylation (DA), present in the form of solid powders at room temperature and readily soluble in aqueous media of pH<6, see e.g.: V. Zargar, M. Asghari, A. Dashti, A Review on Chitin and Chitosan Polymers: Structure, Chemistry, Solubility, Derivatives, and Applications, Chem. Bio. Eng. 2 (2015) p. 204-226; B. Bellich, I. D'Agostino, S. Semeraro, A. Gamini, A Review: "The Good, the Bad and the Ugly" of Chitosans, MDPI-Journal *Mar. Drugs* 2016, 14(5), 99, 32 p. As is apparent from the cited review articles, a large number of applications for the various chitosan products have already opened up.

In the field of packaging means, this relates mainly to the production and modification of papers with aqueous chitosan solutions for the purpose of making them into packaging means for foodstuffs.

On account of the free amino groups formed by the deacetylation, chitosan is present in acidic solutions preferably in the form of a polycation with a high charge density. If the pH of such solutions is shifted into the alkaline range (pH≥6.5), for example by addition of sodium hydroxide solution, then the chitosan very quickly flocculates. This circumstance is used, for example, in order to provide an aramid paper with high abrasion resistance and a low water-absorbing capacity (see EP 0 953 081 B1, DE 6 9804586 T2). For this purpose, aramid fibers in the form of a pulp are dispersed in an acetic chitosan solution having a pH in the range 2.5≤pH≤4.5 and the chitosan is then precipitated onto the dispersed aramid fibers by shifting the pH into the range 6.5≤pH≤11. The coated fibers are then introduced in an amount of from 5 to 95% into the aqueous paper feed, in order subsequently to obtain the special paper of interest in the conventional manner (paper-making screen, water separation, drying). Primary and secondary celluloses can also be coated with chitosan in an analogous manner and used for the production of papers suitable preferably for foodstuffs packaging (see e.g.: Ji-Dong Xu, Ya-Shuai Niu, Pan-Pan Yue, Ya-Jie Hu, Jing Bian, Ming-Fei Li, Feng Peng, Run-Cang Sun, Composite Film Based on Pulping Industry Waste and Chitosan for Food Packaging, MDPI-Journal *Materials* 2018, 11, 2264, 11p.). Such papers, as well as the papers modified by the subsequent coating of conventional papers with a chitosan-containing aqueous solution, are distinguished not only by higher strengths but also by a very low water-absorbing capacity (low COBB index according to DIN EN 20535) and greatly reduced air and water vapor permeabilities (air permeation according to ISO 5636-3, water vapor transmission rate, WVTR according to DIN 53122-1) (see e.g.: S. Kopacic, A. Walzl, A. Zankel, E. Leitner, W. Bauer, Alginate and Chitosan as a Functional Barrier for Paper-Based Packaging Materials, MDPI-Journal *Coatings* 2018, 8, 235, 15 p.).

Although the coating of paper substrates with chitosan, in particular for the production of packaging means, was thus known in principle, it was very surprising that specifically the substance combination used according to the invention, which comprises urea, at least one chitosan biopolymer having a degree of deacetylation (DA) of from 70% to 95%, and at least one dicarboxylic acid in aqueous solution, is outstandingly suitable for providing a large number of different substrates, in particular also non-metallic substrate materials, with a primer coating which makes it possible subsequently to fix conventional combinations of vapor phase corrosion inhibitors, in particular from aqueous or aqueous-alcoholic solution, on such pretreated substrates in a relatively stable manner and thus to make them into particularly efficient VpCI/VCI-emitting packaging means.

The solutions used according to the invention as primers usually have, at 20° C., a pH in the range $4.5 \leq pH \leq 6.0$ and a dynamic viscosity $\eta$ in the range $80 \leq \eta$ $(mPa \cdot s) \leq 380$. If required for adaptation to the surface properties of the substrate to be coated or the available application technology, the dynamic viscosity $\eta$ can be correspondingly regulated by addition of a thickener, in particular of a cellulose-based, non-ionic thickener.

The pretreatment of the surfaces of the substrates, in particular non-metallic substrates, conventional for packaging means which are provided as carrier materials for vapor phase corrosion inhibitors with a primer according to the invention can be carried out by any conventional coating process, such as printing, knife application, brush coating or roller application, and should leave behind a wet film, preferably having a weight per unit area of $\geq 1$ g/m$^2$. After subsequent drying, in particular drying in ambient air, adapted to the water content of the wet film in the temperature range from 60° C. to 75° C. in the drying channel or by means of infra-red radiators, the substrates so pretreated are ready for use, for the fixing thereon of individual or conventional combinations of vapor phase corrosion inhibitors from an aqueous or aqueous-alcoholic solution containing those active ingredients.

By applying a primer according to the invention it is possible to fix vapor phase corrosion inhibitors not only to papers, cardboard and paperboard which can be wetted by aqueous solutions but also, for the first time, to flat or sheet-form plastics materials, such as polyethylene, polypropylene, polyurethane, polystyrene, ABS, biopolymers such as PLA and PHB as well as textile woven fabrics, nonwovens and other materials, in particular hydrophobic materials, in the form of a finely dispersed layer which adheres sufficiently well to the substrate in question and from which the VpCI/VCIs in question can then sublimate with low resistance. By means of the applied amount of VpCI/VCI coating composition it is additionally possible to adapt the VpCI/VCI depot to the requirements of build-up phases that are as short as possible, so that the substrates, in particular non-metallic substrates, treated in this manner according to the invention, as efficient functionally graded materials (FGMs), ensure particularly reliable temporary corrosion protection within packaging, storing and transportation processes of the common commodity metals.

In more specific embodiments, the substrates, in particular non-metallic substrates, are selected from the group which comprises, in addition to paper and paperboard, also typically hydrophobic materials, such as polyethylene, polypropylene, polyurethane, polystyrene, ABS, biopolymers such as PLA and PHB, textile woven fabrics, nonwovens and similar materials, typically hydrophobic materials, in particular in sheet form or flat.

In a typical embodiment, these substrates are carrier materials for the corrosion protection of metallic materials, in particular common commodity metals, within packaging, storage and transportation processes.

The vapor phase corrosion inhibitors to be fixed are typically selected from the group of the conventional VpCI/VCI components and can be selected, for example, from the group which comprises aromatic and aliphatic amines and carboxylic acids, amino alcohols, organic and inorganic amine salts, amine and alkali nitrites, alkali salts of aromatic and aliphatic carboxylic acids, $C_3$- to $C_5$-aminoalkyldiols, primary aromatic amides, polysubstituted pyrimidines, benzotriazole and substituted benzotriazoles, benzimidazole and substituted benzimidazoles, as well as aromatic mercaptothiazoles.

A further aspect of the present invention relates to a substance combination which comprises urea, at least one chitosan biopolymer having a degree of deacetylation of from 70% to 95%, and at least one dicarboxylic acid in aqueous solution, wherein the chitosan is present as component (1) in an amount of from 0.1 to 2% by weight, urea is present as component (2) in an amount of from 10 to 25% by weight, and a dicarboxylic acid is present as component (3) in an amount of from 0.5 to 2.5% by weight, completely dissolved in deionized water.

The water-soluble dicarboxylic acid is selected from the group of the aliphatic saturated dicarboxylic acids and preferably from the group which comprises butanedioic acid (succinic acid), pentanedioic acid (glutaric acid), hexanedioic acid (adipic acid), heptanedioic acid (pimelic acid), 2-aminobutanedioic acid (aspartic acid) or 2-aminopentanedioic acid (glutamic acid) and mixtures thereof.

In a preferred embodiment, the substance combination according to the invention further comprises viscosity regulators, in particular cellulose-based, non-ionic thickeners.

Optionally, two or more components of the substance combination according to the invention can also be present in the substance combination at least partially in a mutually associated form or in the form of conjugates.

Yet a further aspect of the present invention relates to a substrate surface which is coated with a substance combination used according to the invention as described above, in particular after drying thereof, as a primer.

Typically, such substrate surfaces are non-metallic substrate surfaces, in particular in sheet form or flat.

In more specific embodiments, the substrates are selected from the group which comprises, in addition to paper and paperboard, also typically hydrophobic materials, such as polyethylene, polypropylene, polyurethane, polystyrene, ABS, biopolymers such as PLA and PHB, textile woven fabrics, nonwovens and similar materials, typically hydrophobic materials, in particular in sheet form or flat.

In yet a further, closely related aspect, the present invention relates also to a carrier material for vapor phase corrosion inhibitors, wherein the vapor phase corrosion inhibitors are fixed to a substrate surface, in particular of a substrate as described above, preferably of a non-metallic substrate, which has been pretreated with a substance combination used according to the invention.

The substance combinations to be used according to the invention as primers advantageously consist solely of substances which can be processed easily and safely by methods known per se and are to be categorized in the amounts that are to be used as non-toxic and not damaging to the environment. They are thus suitable in particular for the production of anti-corrosive packaging means which are usable on a large scale inexpensively and without a significant risk potential.

The subject-matter of the application is described in greater detail by the following examples. As is also apparent therefrom, the nature and amount of the individual components in an aqueous solution that is prepared according to the invention and is to be used as a primer are governed mainly by the type and surface condition of the substrate material to be coated and not by the VpCI/VCI components which are subsequently to be fixed to the chitosan-containing layer.

Example 1

By metered addition of the individual components in the indicated order and intensive stirring at a maximum of 45° C., the following substance combination according to the invention was prepared as primer no. 1:

| | |
|---|---|
| 75.5 wt. % | deionized water |
| 22.0 wt. % | urea (technical-grade granules) |
| 0.7 wt. % | hexanedioic acid (adipic acid) |
| 1.1 wt. % | chitosan powder type 90/100 (DA = 90%, HEPPE Medical Chitosan, Halle/Sa) |
| 0.5 wt. % | hydroxyethylcellulose (Natrosol 250 GR/Aqualon/France) |

The resulting clear solution had the following characteristic values at 20° C.: pH=5.8; η=285 mPa·s.

Paper webs (kraft paper, unsized, grammage 70 g/m$^2$) were coated with this primer no. 1, a wet film of (20±2) g/m$^2$ being produced. After drying in an air flow channel, an increase in the weight per unit area of about 5 g/m$^2$ was recorded, which corresponds to the dry matter remaining from the primer.

The VpCI/VCI-containing solution no. 1 which was subsequently to be applied was prepared according to U.S. Pat. No. 7,824,482 B2 from the following substances:

| | |
|---|---|
| 6.0 wt. % | octanoic acid (caprylic acid) |
| 2.0 wt. % | 2,4-hexanedienoic acid |
| 2.0 wt. % | 1,6-hexanedioic acid (adipic acid) |
| 1.2 wt. % | methylparaben |
| 2.0 wt. % | nicotinic acid amide |
| 1.0 wt. % | 5,6-dimethylbenzimidazole |
| 5.4 wt. % | potassium hydroxide |
| 0.4 wt. % | Natrosol ® 250 GR |
| 80.0 wt. % | deionized water |

This solution with pH≈6.8 at 20° C. had a solids content of 12 wt. %.

The paper webs pretreated with primer no. 1 according to the invention were then coated with this VpCI/VCI-containing solution no. 1, a wet film of (25±1) g/m$^2$ being produced. After drying in an air flow channel, a further increase in the weight per unit area of about 4 g/m$^2$ was recorded, attributable in this case to the mass fraction of the remaining VpCI/VCI components.

As reference, paper webs of the same type (kraft paper, unsized, grammage 70 g/m$^2$) without pretreatment according to the invention were coated directly with the same VpCI/VCI-containing solution no. 1, and a wet film of (25±1) g/m$^2$ was likewise produced. The subsequent drying process in the air stream channel took several minutes longer, however, obviously because the water of the VpCI/VCI-containing coating solution no. 1 had penetrated the entire paper matrix and was more difficult to desorb without the supply of heat. In addition, the increase in the weight per unit area of these paper webs which could be recorded after drying was only about 2 g/m$^2$ and demonstrates that, in comparison with the paper precoated according to the invention, a smaller mass fraction of the VpCI/VCI components to be fixed had remained. Testing of this paper by chemical analysis by means of HPLC of the methanolic extract revealed that the content of the carboxylic acids in question in particular was below expectations, obviously because some of the VpCI/VCI components, which are considered to be volatile in water vapor, had passed into the air stream channel together with the evaporating water during the drying process.

In order to demonstrate that the VpCI/VCI components fixed to the paper pretreated according to the invention are also emitted in accordance with their relatively high specific surface concentrations, cut pieces from the VpCI/VCI paper were subjected to the conventional jar test in order to assess their VCI corrosion protection properties.

The jar test was carried out using conventional jars (volume 1 liter) into each of which there had been introduced a bottom insert of PMMA, which ensures a distance of about 15 mm from the base of the jar. After the metered addition of 15 ml of deionized water beneath the bottom insert, the individual jars were lined with the VpCI/VCI paper to be tested. This was carried out in each case using a strip measuring 13×25 cm arranged as a liner and a circular cut piece of Ø9 cm for the lid, always with the coated side facing the insert with the test metal sheets to be protected against corrosion. The test metal sheets were placed on the bottom insert before the lid was fitted, for which purpose a strip of PMMA provided with 5 mm deep notches was used. In each case 4 carefully cleaned test metal sheets of different types measuring (90×50×d) mm were positioned therein, at an angle of about 15° to the horizontal and at a distance of 10 mm from one another. For each jar, the test metal sheets were 1 test metal sheet of each of DC 03 steel, cold-rolled, low-carbon, material no. 1.0347, d=0.5 mm, aluminum 99.5, d=0.625 mm (both from Q-Panel, Cleveland), Cu-ETP (MKM Mansfelder Kupfer and Messing GmbH), d=0.5 mm, and hot-dip galvanized steel DX56D+Z140MBO (fine-grain zinc coating 140 g/m$^2$-70/70 g/m$^2$-10 μm, ArcelorMittal), d≈0.8 mm.

Two batches of this type were prepared as reference without positioning of a VpCI/VCI paper.

These batches as well as the jars with the test metal sheets, the deionized water and the cut pieces of the VpCI/VCI paper were closed tightly, for which purpose a lid with a sealing ring and three tension clamps were used in each case. While a waiting time of 16 h at room temperature is generally allowed for the so-called build-up phase of the VCI components within the vessel, it was assumed for the VpCI/VCI paper prepared according to the invention which was to be tested that this build-up phase is already complete after a waiting time of 4 h. The individual jars were then exposed for 16 h in a heating cabinet according to DIN 50011-12 at 40° C. and then again for 8 h at room temperature. This cyclic loading (1 cycle=24 h) was interrupted for a short time after each 7 cycles and the jars were opened for about 2 minutes in order to replace any converted atmospheric oxygen and to inspect the surface state of the metal sheets. After a total of 35 cycles, the exposure was ended and each test specimen was visually assessed in detail outside the jars.

Result of the test: The appearance of the test metal sheets of the 4 different metals which had been used together with the VpCI/VCI paper prepared according to the invention and coated was unchanged after 35 cycles in all 4 parallel batches.

For the two batches which had been exposed as reference without a VpCI/VCI paper, the cyclic climatic stress was terminated after only 7 cycles because signs of corrosion were visible on all the test metal sheets, spots of rust and larger areas of rust at the edges in the case of the test metal sheets of DC 03, a yellowish-brown tarnish film on both sides in the case of Al 99.5, dark spots, in each case starting from the top, on the metal sheets of Cu-ETP, and initial spot-like signs of white rust in the edge regions in the case of the test metal sheets of galvanized steel.

The results of the jar test demonstrate convincingly that, despite a reduced build-up phase, the paper pretreated according to the invention and then provided with a VpCI/VCI combination provides reliable VCI corrosion protection for the conventional common metals on long-term exposure even under extreme moist air conditions.

Example 2

A corrugated cardboard produced largely from reclaimed material (type E flute, grammage 320 g/m$^2$, Hans Kolb Wellpappe, Memmingen) was pretreated with primer no. 1 according to the invention from Example 1 by producing a wet layer of (30±3) g/m$^2$ on one side of the sheet of corrugated cardboard by means of a doctor blade. After drying of the sheet of corrugated cardboard vertically in an air stream channel at room temperature, a dry layer of about 7.5 g/m$^2$ was to be seen.

The VpCI/VCI-containing solution no. 1 from Example 1 was then again applied by means of a doctor blade to the side of the corrugated cardboard which had been pretreated in that manner with primer no. 1 according to the invention, a wet film of (50±3) g/m$^2$ being produced in this case for the purpose of multiple usage of the coated corrugated cardboard. After drying in an air stream channel, a further increase in the weight per unit area of about 8.5 g/m$^2$ could be recorded, attributable in this case to the mass fraction of the remaining VpCI/VCI components.

As reference, sheets of corrugated cardboard of the same type were coated directly with the same VpCI/VCI-containing solution no. 1 without pretreatment according to the invention, and a wet film of (50±3) g/m$^2$ was likewise produced. The subsequent drying process in the air stream channel took longer, however, obviously because the water of this VpCI/VCI-containing coating solution no. 1 had penetrated deeper into the corrugated cardboard and could be brought into a touch-dry state only by supplying heat at 65° C. for 5 minutes. The increase in the weight per unit area of these paper webs which could be recorded after drying was significantly smaller compared with the corrugated cardboard pretreated according to the invention and was only about 3 g/m$^2$. Testing of segments of this corrugated cardboard by chemical analysis by means of HPLC of the methanolic extract again revealed that in particular some of the carboxylic acids in question, which are considered to be volatile in water vapor, had again been lost during the drying process.

In order to demonstrate the extent to which the VpCI/VCI components fixed to the corrugated cardboard from thicker wet films withstand relatively gentle mechanical stresses, circular segments of Ø9 cm were punched out of both coated sheets of corrugated cardboard, held over a Petri dish with the coated side downwards and tapped several times on the rear side with a laboratory spatula. The Petri dish was then rinsed with 5 ml of methanol and the eluate was analyzed by means of HPLC or GC/MS for the qualitative determination of any VpCI/VCI components which had run out.

Result of the Test:

In the case of the segments of the corrugated cardboard pretreated according to the invention and then provided with a VpCI/VCI combination, no running out or detachment of VpCI/VCI components occurred as a result of the described mechanical stress, because the methanol eluate in question did not show any attributable peculiarities even in GC/MS. In the case of the segments of the corrugated cardboard coated only with the VpCI/VCI-containing solution no. 1, slight dust-like specks could already be seen in the Petri dish after the tapping. In the methanol eluate in question, traces of octanoic acid, methylparaben and 5,6-dimethylbenzimidazole could be detected, which again demonstrates that the powdered solids remaining from aqueous solutions on paper or cardboard adhere only slightly, so that VpCI/VCI products produced in this manner are not suitable for reliable VCI corrosion protection. As the results of the described test show convincingly, the corresponding VpCI/VCI products prepared according to the invention and coated, on the other hand, have fixed the corresponding active ingredients, even in higher specific concentrations, at least sufficiently stably that they advantageously withstand relatively gentle mechanical stresses which do not have an abrasive action, without their ability to undergo sublimation, which is required for VCI corrosion protection, being impaired. The latter has already been demonstrated by the results of the jar test described in Example 1.

Example 3

By metered addition of the individual components in the indicated order and intensive stirring at a maximum of 45° C., the following substance combination according to the invention was prepared as primer no. 2:

| | | |
|---|---|---|
| 79.5 wt. % | deionized water | |
| 19.0 wt. % | urea (technical-grade granules) | |
| 0.7 wt. % | pentanedioic acid (glutaric acid) | |
| 1.0 wt. % | chitosan powder type 90/100 (DA = 90%, HEPPE Medical Chitosan, Halle/Sa) | |

The resulting clear solution had the following characteristic values at +20° C.: pH=5.5; η=85 mPa·s.

A 6 mm thick sheet material of expanded polystyrene (EPS, Saarpor Kunststoffe, Neunkirchen) was pretreated with this primer no. 2 by producing a wet film of (90±5) g/m$^2$ on one side by means of a PUR foam roller. Drying of these sheets was carried out for 2 minutes at (65±5)° C. The coating was then dry to handle, the increase in the weight per unit area corresponding to dry matter of about 19 g/m$^2$ remaining from primer no. 2. The resulting coating was cellophane-like, pure white in color and typically structured, so that it could also be visually well perceived.

The aqueous-ethanolic VpCI/VCI-containing solution no. 2 which was subsequently to be applied was prepared from the following substances:

| | |
|---|---|
| 65.0 wt. % | deionized water |
| 22.0 wt. % | technical-grade ethanol |
| 5.0 wt. % | sodium benzoate |
| 5.0 wt. % | 1H-benzotriazole |
| 0.5 wt. % | methylparaben |
| 1.5 wt. % | sodium nitrite |
| 1.0 wt. % | sodium carbonate |

This solution with pH≈8.6 at 20° C. had a solids content of about 13 wt. %. The EPS sheets pretreated with primer no. 2 according to the invention were then coated with this VpCI/VCI-containing solution no. 2 by means of a PUR foam roller, a wet film of (25±1) g/m² being produced. After drying in an air stream channel, a further increase in the weight per unit area of about 3 g/m² could be recorded, attributable in this case to the mass fraction of the remaining VpCI/VCI components.

The preparation of reference samples with EPS sheets which had not been pretreated according to the invention was not possible because the aqueous-ethanolic VpCI/VCI-containing solution no. 2 rolled off their surfaces without VCI active ingredients remaining thereon.

In order to demonstrate that the VpCI/VCI components fixed to the EPS sheets pretreated according to the invention are also emitted in accordance with their specific surface concentrations, cut pieces of the VpCI/VCI EPS sheets measuring 90×50 mm were subjected to the jar test described in Example 1 in order to assess their VCI corrosion protection properties.

Since the nitrite-containing preparation of the VpCI/VCI-containing solution no. 2 is to be used preferably for the corrosion protection of iron materials, the strip of PMMA positioned in the individual jars was in each case provided at the center with a test metal sheet of DC 03 steel and also a sheet of grey iron GGG25 of the same size but with a thickness of 2 mm, flanked on the outer sides in each case by a cut piece of the coated EPS material with the coated side oriented towards the test specimen to be protected. The 5 mm deep notches in the strips of PMMA had been adapted beforehand in terms of their width to the thickness of the GGG and EPS sheets.

Two batches of this type were prepared as reference without positioning of the EPS sheets provided with the VpCI/VCI system.

Otherwise, this jar test was again carried out in accordance with the description given in Example 1.
Result of the Test:

The appearance of the test specimens of DC03 steel and GGG25, which had been used together with segments of the EPS sheets prepared according to the invention and provided with VpCI/VCI, was unchanged after 35 cycles in all 4 parallel batches.

For the two batches which had been exposed as reference without a VpCI/VCI system, the cyclic climatic stress had to be terminated after only 7 cycles because the test specimens of GGG25 especially were already covered with a thick layer of rust.

The results of this jar test demonstrate convincingly that the EPS material pretreated according to the invention and then provided with a VpCI/VCI combination emits the fixed VpCI/VCI components to a sufficient extent, despite the reduced build-up phase, so that reliable VCI corrosion protection is obtained on long-term exposure even under the extreme moist air conditions.

EPS sheets provided in the manner according to the invention with a different VpCI/VCI system can be used, for example, as inner sides or partitions functioning as VpCI/VCI emitters in VCI packaging containers such as small cartons or trays or lids for such containers.

Example 4

By metered addition of the individual components in the indicated order and intensive stirring, the following substance combination according to the invention was prepared as primer no. 3:

| | |
|---|---|
| 79.3 wt. % | deionized water |
| 19.0 wt. % | urea (technical-grade granules) |
| 0.7 wt. % | pentanedioic acid (glutaric acid) |
| 1.0 wt. % | chitosan powder type 80/200 (DA = 80%, HEPPE Medical Chitosan, Halle/Sa.) |

The resulting clear solution had the following characteristic values at 20° C.: pH=5.8; dynamic viscosity η=185 mPa·s.

The 6 mm thick sheet material of expanded polystyrene (EPS, Saarpor Kunststoffe KG, Neunkirchen) was again pretreated with this primer no. 3 by producing a wet film of (90±5) g/m² on one side by means of a PUR foam roller. Drying of these sheets was carried out for 2 minutes at (65±5)° C. The coating was then dry to handle, the increase in the weight per unit area corresponding to dry matter of about 20 g/m² remaining from primer no. 3. As in Example 3, the resulting coating was again cellophane-like, pure white in color and typically structured, so that it could also be visually well perceived.

The VpCI/VCI-containing solution no. 3 which was subsequently to be applied was prepared according to EP 2 357 266 from the following substances:

| | |
|---|---|
| 70 wt. % | deionized water |
| 19.5 wt. % | technical-grade ethanol |
| 4.7 wt. % | sodium benzoate |
| 2.6 wt. % | 1H-benzotriazole |
| 1.4 wt. % | N-butylurea |
| 1.3 wt. % | 2-amino-4-methylpyrimidine |
| 0.5 wt. % | 2-amino-2-methyl-1,3-propanediol |

This solution with pH≈8.2 at 20° C. had a solids content of 10.5 wt. %. The EPS sheets pretreated with primer no. 3 according to the invention were then coated with this VpCI/VCI-containing solution no. 3 by means of a PUR foam roller, a wet film of (35±1) g/m² being produced. After drying in an air stream channel, a further increase in the weight per unit area of about 3.7 g/m² could be recorded, attributable in this case to the mass fraction of the remaining VpCI/VCI components.

The preparation of reference samples with EPS sheets which had not been pretreated according to the invention was not possible because the aqueous-ethanolic VpCI/VCI-containing solution no. 3 rolled off their surfaces without VCI active ingredients remaining thereon.

In order to demonstrate the extent to which the VpCI/VCI components fixed to the EPS sheets pretreated according to the invention from thicker wet films withstand relatively gentle mechanical stresses, cut pieces of these VpCI/VCI sheets measuring 90×50 mm were again held over a Petri dish with the coated side downwards and tapped several times on the rear side with a laboratory spatula. The Petri dish was then rinsed with 5 ml of methanol and the eluate was analyzed by means of HPLC or GC/MS for the qualitative determination of any VpCI/VCI components which had run out.

Result of the Test:

In the case of the cut pieces of the EPS sheets pretreated according to the invention and then provided with a VpCI/VCI combination, no detachment of VpCI/VCI components occurred as a result of the described mechanical stress, because the methanol eluate in question did not show any attributable peculiarities even in GC/MS.

This result demonstrates convincingly that VpCI/VCI components from aqueous-alcoholic solutions are fixed on EPS sheets prepared according to the invention at least sufficiently stably, even in higher specific concentrations, that they advantageously withstand relatively gentle mechanical stresses which do not have an abrasive action, without their ability to undergo sublimation, which is necessary for VCI corrosion protection, being impaired. It thus appears wholly recommendable to provide efficient VpCI/VCI-emitting reusable packaging means in this manner, especially since this is not possible without the pretreatment according to the invention of the EPS surfaces.

Example 5

By metered addition of the individual components in the indicated order and intensive stirring, the following substance combination according to the invention was prepared as primer no. 4:

| | |
|---|---|
| 80.0 wt. % | deionized water |
| 18.0 wt. % | urea (technical-grade granules) |
| 0.9 wt. % | butanedioic acid (succinic acid) |
| 1.1 wt. % | chitosan powder of batch 300.298 (DA = 90%, C. E. RÖPER, Hamburg) |

The resulting clear solution had the following characteristic values at 20° C.: pH=5.3; $\eta$ =225 mPa·s.

A 12 mm thick PUR block foam MA 5080, white (METZELER Schaum, Memmingen) was coated with this medium viscosity primer no. 4 by means of rollers, a wet film of (75±5 g/m²) being produced. After the coated PUR block foam had been dried for about 2 minutes at from 60 to 70° C. in a recirculating air channel, an increase in the weight per unit area of about 15 g/m² was recorded, which corresponds to the remaining dry matter from primer no. 4. The resulting coating was again cellophane-like, pure white in color and typically structured, so that it could be visually well perceived even on the white PUR block foam.

The aqueous VpCI/VCI-containing solution no. 4 which was subsequently to be applied was prepared from the following substances:

| | |
|---|---|
| 81.5 wt. % | deionized water |
| 8.5 wt. % | sodium benzoate |
| 7.0 wt. % | 1H-benzotriazole |
| 1.0 wt. % | benzoic acid |
| 2.0 wt. % | sodium octanoate (sodium caprylate) |

This solution with pH≈5.5 at 20° C. has a solids content of 18.5 wt. %. The PUR block foam pretreated with primer no. 4 according to the invention was then coated with this VpCI/VCI-containing solution no. 4 by means of a PUR foam roller, a wet film of (30±3) g/m² being produced.

After drying in an air stream channel, a further increase in the weight per unit area of about 5.5 g/m² could be recorded, attributable in this case to the mass fraction of the remaining VpCI/VCI components.

The preparation of reference samples with PUR block foam MA 5080 which had not been pretreated according to the invention was not possible because the aqueous VpCI/VCI-containing solution no. 4 rolled off their surfaces without VCI active ingredients remaining thereon.

In order to demonstrate the extent to which the VpCI/VCI components fixed to the PUR block foam pretreated according to the invention from thicker wet films withstand relatively gentle mechanical stresses, cut pieces of the VpCI/VCI block foam measuring 90×50 mm were tested analogously to the procedure described in Example 4.

Result of the Test:

In the case of the cut pieces of the PUR block foam pretreated according to the invention and then provided with a VpCI/VCI combination, no detachment or running out of VpCI/VCI components occurred as a result of the described mechanical stress, because the methanol eluate in question from the Petri dish did not show any attributable peculiarities even in GC/MS.

This result demonstrates convincingly that VpCI/VCI components from aqueous solutions are fixed on PUR block foam prepared according to the invention at least sufficiently stably, even in higher specific concentrations, that they advantageously withstand relatively gentle mechanical stresses which do not have an abrasive action, without their ability to undergo sublimation, which is necessary for VCI corrosion protection, being impaired. It again appears recommendable to provide efficient VpCI/VCI donors in this manner, for example, as intermediate layers in plastics trays used for temporary corrosion protection, especially since this is not possible without the pretreatment according to the invention of a PUR block foam.

Example 6

By metered addition of the individual components in the indicated order and intensive stirring, the following substance combination according to the invention was prepared as primer no. 5:

| | |
|---|---|
| 80.0 wt. % | deionized water |
| 18.0 wt. % | urea (technical-grade granules) |
| 0.9 wt. % | pentanedioic acid (glutaric acid) |
| 1.1 wt. % | chitosan powder of batch 300.298 (DA = 90%, C. E. RÖPER, Hamburg) |

The resulting clear solution had the following characteristic values at 20° C.: pH=5.4; dynamic viscosity $\eta$=220 mPa·s.

Sheets of expanded polypropylene (EPP, BS Systems, Zusmarshausen) were coated with this medium viscosity primer no. 5, a wet film of (20±2) g/m² being produced. After drying in an air stream channel, an increase in the weight per unit area of about 5 g/m² was recorded, which corresponds to the dry matter remaining from the primer. The resulting coating was again cellophane-like, pure white in color and typically structured, so that it could also be visually well perceived.

The aqueous VpCI/VCI-containing solution no. 5 which was subsequently to be applied was prepared from the following substances:

| | |
|---|---|
| 80.0 wt. % | deionized water |
| 10.0 wt. % | sodium benzoate |
| 6.0 wt. % | 1H-benzotriazole |
| 6.0 wt. % | cyclohexylammonium benzoate |

This solution with pH≈6.7 at 20° C. has a solids content of 22 wt. %. The EPP sheets pretreated with primer no. 5 according to the invention were then coated with this VpCI/VCI-containing solution no. 5 by means of a PUR foam roller, a wet film of (15±2) $g/m^2$ being produced.

After drying in an air stream channel, a further increase in the weight per unit area of about 4.0 $g/m^2$ could be recorded, attributable in this case to the mass fraction of the remaining VpCI/VCI components.

The preparation of reference samples with the EPP sheets which had not been pretreated according to the invention was not possible, as expected, because the aqueous VpCI/VCI-containing solution no. 5 rolled off their surfaces without VCI active ingredients remaining thereon.

In order to demonstrate that the VpCI/VCI components fixed to the EPP plates pretreated according to the invention are also emitted in accordance with their specific surface concentrations, cut pieces of the VpCI/VCI EPP sheets measuring 90×50×2 mm were subjected to the jar test described in Example 1 in order to assess their VCI corrosion protection properties.

Since the preparation of the VpCI/VCI-containing solution no. 5 is to be used preferably for the corrosion protection of Al materials and galvanized steels, the strip of PMMA positioned in the individual jars was in each case provided at the center with a test metal sheet of aluminum 99.5, d=0.625 mm (both Q-Panel Cleveland) and also a test metal sheet of hot-dip galvanized steel DX56D+Z140MBO (fine-grain zinc coating 140 $g/m^2$-70/70 $g/m^2$-10 μm, ArcelorMittal), d≈0.8 mm, flanked on the outer sides in each case by a cut piece of the EPP material coated according to the invention with the coated side oriented towards the test specimen to be protected. The 5 mm deep notches in the strips of PMMA had been adapted beforehand in terms of their width to the thickness of the EPP sheets at those points.

Two batches of this type were prepared as reference without positioning of the EPP plates provided with the VpCI/VCI system. Otherwise, this jar test was again carried out in accordance with the description given in Example 1.

Result of the Test:

The appearance of the test specimens of Al 99.5 and the hot-dip galvanized steel, which had been used together with segments of the EPP plates prepared according to the invention and provided with VpCI/VCI, was unchanged after 35 cycles in all 4 parallel batches.

For the two batches which had been exposed as reference without a VpCI/VCI system, the cyclic climatic stress had to be terminated after only 7 cycles because the test specimens of hot-dip galvanized zinc especially were already covered with a thick layer of red and white rust.

The results of this jar test demonstrate convincingly that the EPP material pretreated according to the invention and then provided with a VpCI/VCI combination emits the fixed VpCI/VCI components to a sufficient extent, despite the reduced build-up phase, so that reliable VCI corrosion protection is obtained on long-term exposure even under the extreme moist air conditions.

Analogous results were obtained when extruded PP solid sheets with a very slight relief (Eicoplast Kunststoffverarbeitung, Rodinghausen) were treated and tested.

Polyolefin sheets provided in this manner according to the invention with a different VpCI/VCI system can advantageously likewise be used as inner sides or partitions, functioning as VpCI/VCI emitters, of plastics trays which are to be used for temporary corrosion protection.

What is claimed is:

1. A method for pretreating substrate surfaces, which are provided as carrier materials for vapor phase corrosion inhibitors, in order to facilitate or enable subsequent fixing to the substrate surfaces of vapor phase corrosion inhibitors from an aqueous or aqueous-alcoholic solution comprising the vapor phase corrosion inhibitors, which method comprises applying a substance combination which comprises urea, at least one chitosan biopolymer having a degree of deacetylation of from 70% to 95%, and at least one dicarboxylic acid in aqueous solution, as a primer onto said substrate surfaces.

2. The method according to claim 1, in which the at least one dicarboxylic acid is an aliphatic saturated dicarboxylic acid.

3. The method according to claim 2, wherein the at least one dicarboxylic acid is a member selected from the group consisting of butanedioic acid, pentanedioic acid, hexanedioic acid, heptanedioic acid, 2-aminobutanedioic acid, 2-aminopentanedioic acid and mixtures thereof.

4. The method according to claim 1, wherein the at least one chitosan biopolymer is present in the substance combination as component (1) in an amount of from 0.1 to 2% by weight, urea is present as component (2) in an amount of from 10 to 25% by weight and the at least one dicarboxylic acid is present as component (3) in an amount of from 0.5 to 2.5% by weight, completely dissolved in deionized water.

5. The method according to claim 1, wherein the substance combination further comprises cellulose-based, nonionic thickeners as viscosity regulators.

6. The method according to claim 1, wherein the substrate surfaces are surfaces of non-metallic substrates.

7. The method according to claim 6, wherein the non-metallic substrates are flat or sheet-form non-metallic substrates.

8. The method according to claim 6, wherein the non-metallic substrates are members selected from the group consisting of paper, cardboard, flat or sheet-form plastic materials, biopolymers, textile woven fabrics and nonwovens.

9. The method according to claim 1, wherein substrates of the substrate surfaces are selected from the group consisting of polyethylene, polypropylene, polyurethane, polystyrene, acrylonitrile-butadiene-styrene (ABS), polylactide (PLA) and polyhydroxybutryate (PHB).

10. The method according to claim 1, wherein substrates of the substrate surfaces are carrier materials for corrosion protection of metallic materials within packaging, storage and transportation processes.

11. The method according to claim 1, wherein the vapor phase corrosion inhibitors comprise a combination of VpCI (vapor phase corrosion inhibitors) and VCI (volatile corrosion inhibitors).

12. The method according to claim 11, wherein the vapor phase corrosion inhibitors are members selected from the group consisting of aromatic and aliphatic amines and carboxylic acids, amino alcohols, organic and inorganic amine salts, amine and alkali nitrites, alkali salts of aromatic and aliphatic carboxylic acids, $C_3$- to $C_5$-aminoalkyldiols, primary aromatic amides, polysubstituted pyrimidines, benzotriazole and substituted benzotriazoles, benzimidazole, substituted benzimidazoles and aromatic mercaptothiazoles.

13. The method according to claim 1, which comprises applying the substance combination as a primer by use of a wet film having a weight per unit area of ≥1 g/m².

14. The method according to claim 13, wherein the primer is applied by printing, knife application, brush coating or roller application with subsequent drying.

15. The method according to claim 14, wherein the drying is:
(a) carried out in ambient air, (b) adapted to a water content of the wet film, and (c) in a temperature range from 60° C. to 75° C. in a drying channel or by use of infra-red radiators.

16. A method for providing a carrier material for vapor phase corrosion inhibitors, which comprises:
pretreating a substrate with a substance combination which comprises urea, at least one chitosan biopolymer having a degree of deacetylation of from 70% to 95%, and at least one dicarboxylic acid in aqueous solution, so as to provide a pretreated substrate,
and drying, and subsequently fixing to the pretreated substrate vapor phase corrosion inhibitors from an aqueous or aqueous-alcoholic solution comprising the vapor phase corrosion inhibitors.

17. The method according to claim 16, wherein the substrate is a non-metallic substrate.

* * * * *